United States Patent
Önnheim (10) Patent No.: US 11,116,232 B2
(45) Date of Patent: Sep. 14, 2021

(54) METHOD AND SYSTEM FOR PRODUCING MILK PRODUCTS HAVING DIFFERENT FAT CONTENTS

(71) Applicant: Tetra Laval Holdings & Finance S.A., Pully (CH)

(72) Inventor: Magnus Önnheim, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 16/772,231

(22) PCT Filed: Dec. 17, 2018

(86) PCT No.: PCT/EP2018/085107
§ 371 (c)(1),
(2) Date: Jun. 12, 2020

(87) PCT Pub. No.: WO2019/121443
PCT Pub. Date: Jun. 27, 2019

(65) Prior Publication Data
US 2021/0000130 A1 Jan. 7, 2021

(30) Foreign Application Priority Data
Dec. 22, 2017 (EP) .................................... 17210077

(51) Int. Cl.
*A23C 9/142* (2006.01)
*A23C 13/14* (2006.01)

(52) U.S. Cl.
CPC ............ *A23C 9/1422* (2013.01); *A23C 13/14* (2013.01); *A23C 2210/252* (2013.01)

(58) Field of Classification Search
CPC .. A23C 9/1422; A23C 13/14; A23C 2210/252

USPC ........... 426/490, 491, 580, 586; 99/452, 456
See application file for complete search history.

(56) References Cited

U.S. PATENT DOCUMENTS 3,983,257 A   9/1976   Malmberg
5,260,079 A   11/1993  Zettier

FOREIGN PATENT DOCUMENTS

DE   32 38 462 A1   4/1984
EP   3 167 721 A1   5/2017

OTHER PUBLICATIONS

International Search Report for corresponding Application No. PCT/EP2018/085107, dated Feb. 11, 2019.
Extended European Search Report for corresponding Application No. 18212842.1, dated Mar. 21, 2019.
International Preliminary Report Patentability for corresponding Application No. PCT/EP2018/085107, dated Jul. 2, 2020.

*Primary Examiner* — Leslie A Wong
(74) *Attorney, Agent, or Firm* — Renner, Otto, Boisselle & Sklar, LLP (57) ABSTRACT

A method for producing a first milk product having a first fat content and a second milk product having a second fat content. The method includes separating raw milk into cream and skim milk, diverting a first part of the cream into a first cream pipe, and a second part of the cream into a second cream pipe, dividing the skim milk in the main skim milk pipe, such that a first part of the skim milk flows into a first skim milk pipe and a second part of the skim milk flows into a second skim milk pipe. Flow rates for the two cream parts and the skim milk parts are determined, and valves are adjusted based on the determined flow rates, such that the milk products are obtained when mixing the cream and skim milk parts.

15 Claims, 4 Drawing Sheets

METHOD AND SYSTEM FOR PRODUCING MILK PRODUCTS HAVING DIFFERENT FAT CONTENTS

This application is a 371 of PCT/EP2018/085107, filed Dec. 17, 2018.

TECHNICAL FIELD

The invention generally relates to the field of milk processing, and more particularly to the field of fat standardization of milk.

BACKGROUND ART

Today it is common practice to fat standardize milk. The general principle is to separate raw milk into cream and skim milk, and in a next step add part of the cream to the skim milk in a controlled manner such that a standardized milk product with a precise fat content is obtained. Since most standardized milk product have a fat content below the fat content of the raw milk, surplus cream is obtained. This surplus cream may be processed into other products.

Modern milk standardization systems are so-called direct, in-line standardization systems that are made to continuously measure properties of the milk, flow rates and pressure levels in different parts of the system in order to control valves and pumps such that the precise fat content of the milk is achieved. By continuously measuring the properties of the milk and re-adjust positions of valves and speed of pumps accordingly, it is possible for instance to compensate for fluctuations in fat content of the raw milk.

Even though fat standardization is known and even though present equipment used for fat standardization can provide precise control of how much of the cream should be added to the skim milk, there is a need for more flexible and cost efficient solutions.

SUMMARY

It is an object of the invention to at least partly overcome one or more of the above-identified limitations of the prior art. In particular, it is an object to provide a method and system for efficiently producing milk products having different fat contents.

According to a first aspect it is provided a method for producing a first milk product MP1 having a first fat content MPF1 and a second milk product MP2 having a second fat content MPF2, said method comprising separating raw milk RM into cream CR and skim milk SM, wherein the cream CR is fed to a main cream pipe and the skim milk SM to a main skim milk pipe, diverting, from the main cream pipe, a first part CR1 of the cream CR into a first cream pipe, and a second part CR2 of the cream CR into a second cream pipe, wherein a surplus part CRS of the cream CR is fed through the main cream pipe, dividing the skim milk SM in the main skim milk pipe, such that a first part SM1 of the skim milk SM flows into a first skim milk pipe and a second part SM2 of the skim milk SM flows into a second skim milk pipe, determining, based on the first fat content MPF1 and the second fat content MPF2, a first cream flow rate $Q_{CR1}$ for the first cream part CR1 flowing in the first cream pipe,
a second cream flow rate $Q_{CR2}$ for the second cream part CR2 flowing in the second cream pipe,
a first skim milk flow rate $Q_{SM1}$ for the first skim milk part SM1 flowing in the first skim milk pipe, and
a second skim milk flow rate $Q_{SM2}$ for the second skim milk part SM2 flowing in the second skim milk pipe,
adjusting, to obtain the first cream flow rate $Q_{CR1}$, the second cream flow rate $Q_{CR2}$, the first skim milk flow rate $Q_{SM1}$ and the second skim milk flow rate $Q_{SM2}$, a set of valves that controls flows of liquid through the first cream pipe, the second cream pipe, the first skim milk pipe, and the second skim milk pipe, combining the cream CR1 flowing in the first cream pipe with the skim milk SM1 flowing in the first skim milk pipe into the first milk product MP1, and combining the cream CR2 flowing in the second cream pipe with the skim milk SM2 in the second skim milk pipe into the second milk product MP2.

The first and second fat contents are different form each other. The determining of the flow rates involves calculating what the flow rates should be so that, when the cream parts and skim milk parts are mixed as described above, the desired fat contents of the first and second milk products are obtained.

The step of separating the raw milk RM into the cream CR and the skim milk SM may be performed by only one separator.

The first milk product MP1 and the second milk product MP2 may be continuously produced. This means that no cream or skim milk pass any buffer tank before being mixed to form the first and second milk products. In this context, a buffer tank can be understood as a liquid holding vessel that has a volume greater than 200 liters.

The method may further comprise determining, based on the first fat content and the second fat content, a surplus cream flow rate $Q_{CRS}$ for the surplus part CRS of the cream CR flowing in the main cream pipe, and adjusting, based on the first cream flow rate $Q_{CR1}$, the second cream flow rate $Q_{CR2}$, the first skim milk flow rate $Q_{SM1}$, the second skim milk flow rate $Q_{SM2}$ and the surplus cream flow rate $Q_{CRS}$, a first cream control valve arranged in the first cream pipe, a second cream control valve arranged in the second cream pipe, a first skim milk control valve arranged in the first skim milk pipe, a second skim milk control valve arranged in the second skim milk pipe, a surplus cream control valve arranged in the main cream pipe.

The first fat content MPF1 or the second fat content MPF2 may be higher than a fat content RMF of the raw milk RM.

The raw milk may have a temperature from 3 to 25 degrees Celsius.

The method may further comprise filtering the skim milk in the main skim milk pipe to provide a protein rich retentate RET, before the dividing of the skim milk SM in the main skim milk pipe.

The step of adjusting, to obtain the first cream flow rate $Q_{CR1}$, the second cream flow rate $Q_{CR2}$, the first skim milk flow rate $Q_{SM1}$ and the second skim milk flow rate $Q_{SM2}$, the set of valves that controls flows of liquid through the first cream pipe, the second cream pipe, the first skim milk pipe, and the second skim milk pipe, may further comprise measuring an actual first cream flow rate $AQ_{CR1}$ flowing in the first cream pipe, measuring an actual second cream flow rate $AQ_{CR2}$ flowing in the second cream pipe, measuring an actual first skim milk flow rate $AQ_{SM1}$ flowing in the first skim milk pipe, measuring an actual second skim milk flow rate $AQ_{SM2}$ flowing in the second skim milk pipe 118, determining a position of the first cream control valve arranged in the first cream pipe based on the actual first cream flow rate $AQ_{CR1}$ and the actual first skim milk flow rate $AQ_{SM1}$, determining a position of the second cream control valve arranged in the second cream pipe based on the actual second cream flow rate $AQ_{CR2}$ and the actual second skim milk flow rate $AQ_{SM2}$, determining a position of the first skim milk control valve arranged in the first skim milk pipe based on the actual first cream flow rate $AQ_{CR1}$ and the actual first skim milk flow rate $AQ_{SM1}$, and determining a position of the second cream control valve arranged in the second cream pipe based on the actual second cream flow rate $AQ_{CR2}$ and the actual second skim milk flow rate $AQ_{SM2}$.

The step of determining, based on the first fat content MPF1 and the second fat content MPF2, the first cream flow rate $Q_{CR1}$, the second cream flow rate $Q_{CR2}$, the first skim milk flow rate $Q_{SM1}$, and the second skim milk flow rate $Q_{SM2}$ is further based on a fat content CRF of the cream CR in the main cream pipe and a fat content SMF of the skim milk SM in the main skim milk pipe 108.

According a second aspect it is provided a system for producing a first milk product MP1 with a first fat content MPF1 and a second milk product MP2 with a second fat content MPF2, said system comprising a separator arranged to receive raw milk RM and to output cream CR in a main cream pipe and skim milk SM in a main skim milk pipe, a cream pipe arrangement comprising the main cream pipe, a first cream pipe and a second cream pipe, wherein the first and second cream pipe divert from the main cream pipe, a skim milk pipe arrangement comprising the main skim milk pipe, a first skim milk pipe and a second skim milk pipe, wherein the main skim milk pipe is divided into the first and second skim milk pipe, a set of valves that controls flows of liquid through the first cream pipe, the second cream pipe, the first skim milk pipe, and the second skim milk pipe, a control unit configured to determine, based on the first fat content and the second fat content, a first cream flow rate $Q_{CR1}$ for the first cream part CR1 flowing in the first cream pipe, a second cream flow rate $Q_{CR2}$ for the second cream part CR2 flowing in the second cream pipe, a first skim milk flow rate $Q_{SM1}$ for the first skim milk part SM1 flowing in the first skim milk pipe, and a second skim milk flow rate $Q_{SM2}$ for the second skim milk part SM2 flowing in the second skim milk pipe, and to adjust, to obtain the first cream flow rate $Q_{CR1}$, the second cream flow rate $Q_{CR2}$, the first skim milk flow rate $Q_{SM1}$ and the second skim milk flow rate $Q_{SM2}$, the set of valves, a first milk product pipe arrangement comprising the first cream pipe, the first skim milk pipe and a first milk product pipe, wherein the first cream pipe and the first skim milk pipe feed into the first milk product pipe, and a second milk product pipe arrangement comprising the second cream pipe, the second skim milk pipe and a second milk product pipe, wherein the second cream pipe and the second skim milk pipe feed into the second milk product pipe.

The system may be void of buffer tanks.

The control unit may further be configured to determine, based on the first fat content and the second fat content, a surplus cream flow rate $Q_{CRS}$ for the surplus part CRS of the cream CR flowing in the main cream pipe, and to adjust, based on the first cream flow rate $Q_{CR1}$, the second cream flow rate $Q_{CR2}$, the first skim milk flow rate $Q_{SM1}$, the second skim milk flow rate $Q_{SM2}$ and the surplus cream flow rate $Q_{CRS}$, a first cream control valve arranged in the first cream pipe, a second cream control valve arranged in the second cream pipe, a first skim milk control valve arranged in the first skim milk pipe, a second skim milk control valve arranged in the second skim milk pipe, and a surplus cream control valve arranged in the main cream pipe.

The raw milk RM may have a temperature from 3 to 25 Celsius degrees.

The system may further comprise a filtration device placed in the main skim milk pipe to provide a protein rich retentate RET.

The filtration device may be an ultrafiltration device.

The features described herein for the method may be implemented for the system as well, and vice versa.

Objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
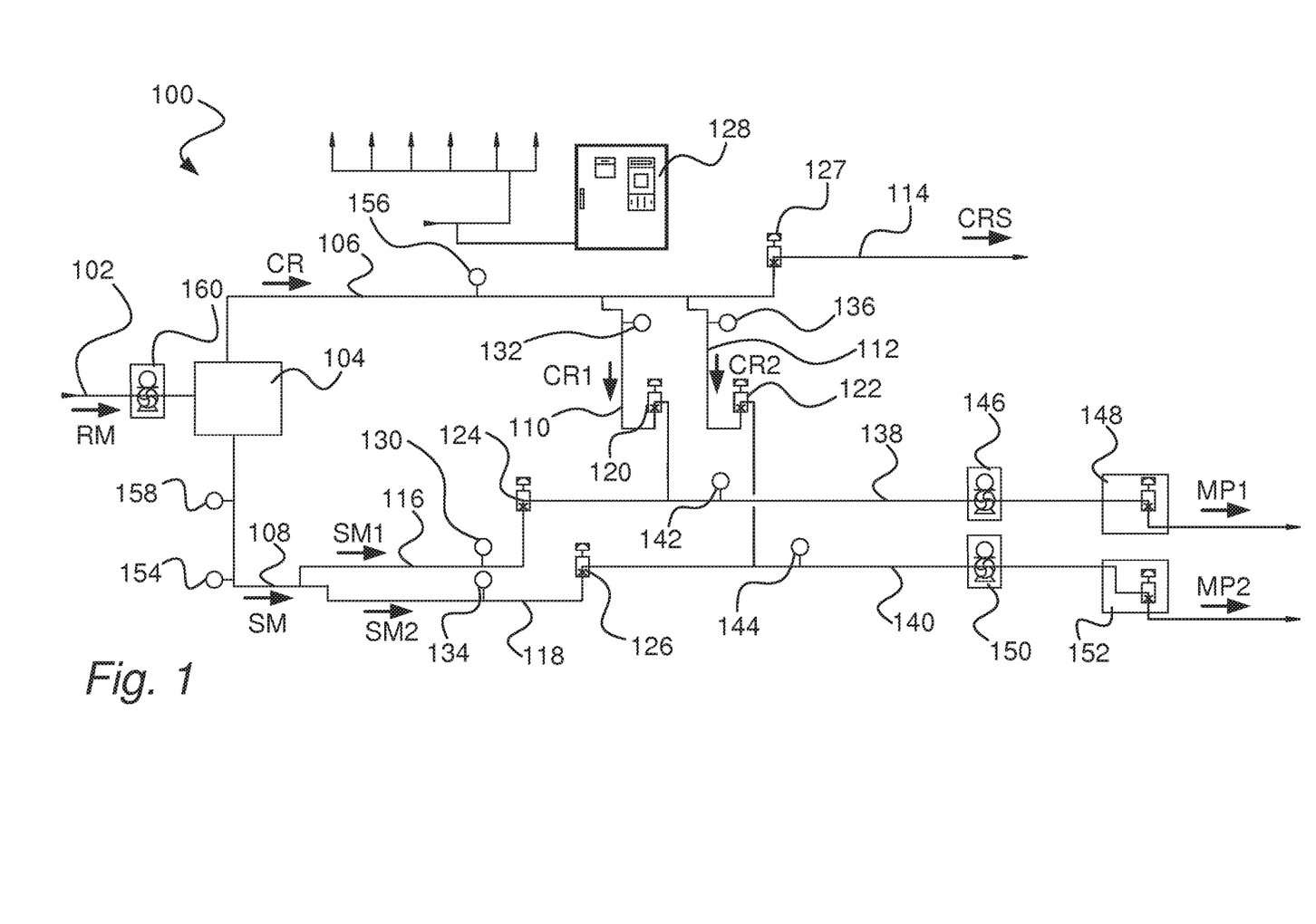
FIG. 1 is a schematic illustration of a system according to a first embodiment.

With reference to FIG. 1, it is illustrated a system 100 for producing a first milk product MP1 having a first fat content MPF1 and a second milk product MP2 having a second fat content MPF2 by way of example.

On a general level, raw milk RM is fed into the system 100 via a raw milk pipe 102. After having been fed into the system 100 the raw milk RM is separated into cream CR and skim milk SM by a separator 104. The cream CR is fed from the separator 104 into a main cream pipe 106 and the skim milk SM is fed from the separator 104 via a skim milk main pipe 108. A first part CR1 of the cream CR fed in the main cream pipe 106 is diverted to a first cream pipe 110 and a second part CR2 of the cream CR is diverted to a second cream pipe 112. Surplus cream CRS, that is cream CR not diverted from the main cream pipe 106 into the first cream pipe 110 or the second cream pipe 112, can be fed through the main pipe 114 and be further processed into other products. The skim milk SM fed in the main skim milk pipe 108 is divided into a first part SM1 of the skim milk SM in a first skim milk pipe 116 and a second part SM2 of the skim milk SM in a second skim milk pipe 118. By adjusting flow rates of the first and second cream pipes 110, 112 and the first and second skim milk pipes 116, 118 it is possible to combine the first part SM1 of skim milk in the first skim milk pipe 116 and the first part CR1 of the cream in the first cream pipe 110 into the first milk product MP1 and, correspondingly, it is possible to combine the second part SM2 of the skim milk in the second skim milk pipe 118 and the second part CR2 of the cream in the second cream pipe 112 into the second milk product MP2.

In order to control the flow rates, a first cream control valve 120 can be provided on the first cream pipe 110, a second cream control valve 122 can be provided on the second cream pipe 112, a first skim milk control valve 124 can be provided on the first skim milk pipe 116, and a second skim milk control valve 126 can be provided on the second skim milk pipe 118. Further, a cream surplus control valve 127 may be provided on the main cream pipe 114.

A control unit 128 can be used for determining, based on the first fat content MPF1 and the second fat content MPF2, a first cream flow rate $Q_{CR1}$ for the first cream part CR1 flowing in the first cream pipe 110, a second cream flow rate $Q_{CR2}$ for the second cream part CR2 flowing in the second cream pipe 112, a first skim milk flow rate $Q_{SM1}$ for the first skim milk part SM1 flowing in the first skim milk pipe 116, and a second skim milk flow rate $Q_{SM2}$ for the second skim milk part SM2 flowing in the second skim milk pipe 118. After having determined the flow rates the control unit can adjust the set of valves 120, 122, 124, 126 that controls flows of liquid through the first cream pipe 110, the second cream pipe 112, the first skim milk pipe 116, and the second skim milk pipe 118 such that the first cream flow rate $Q_{CR1}$, the second cream flow rate $Q_{CR2}$, the first skim milk flow rate $Q_{SM1}$ and the second skim milk flow rate $Q_{SM2}$ are obtained.

In order to determine the flow rates by the control unit 128, input may be gathered by using a first skim milk flow transmitter 130 provided in the first skim milk pipe 116 for measuring an actual first skim milk flow rate $AQ_{SM1}$ and a first cream pipe flow transmitter 132 for measuring an actual first cream flow rate $AQ_{CR1}$. Based on this input and the first fat content MPF1 set for the first milk product MP1, a position of the first cream control valve 120 and a position of the first skim milk control valve 124 can be determined. Similarly, by using a second skim milk flow transmitter 134 provided in the second skim milk pipe 118 for measuring an actual second skim milk flow rate $AQ_{SM2}$ and a first cream pipe flow transmitter 136 of the second cream pipe 112 for measuring an actual second cream flow rate $AQ_{CR2}$ and the second fat content MPF2 of the second milk product MP2, positions of the second cream control valve 122 and the second skim milk control valve 126 can be determined.

The control unit 128 can further be configured to regulate blend pressure points in a first milk product pipe 138, to which the first skim milk pipe 116 and the first cream pipe 110 feed, and a second milk product pipe 140, to which the second skim milk pipe 118 and the second cream pipe 112 feed. In order to regulate the blend pressure point of the first milk product pipe 138, a first pressure measurement made by a first pressure transmitter 142 can be received by the control unit 128. Based on this input the blend pressure point in the first product pipe 138 may be increased by using a first booster pump 146 or decreased by adapting a first product pipe valve 148, which may be a constant-pressure modulating (CPM) valve. Similarly, in order to regulate the blend pressure point of the second milk product pipe 140, a second pressure measurement made by a second pressure transmitter 144 can be received by the control unit 128. Based on this input the blend pressure in the second product pipe 140 may be increased by using a second booster pump 150 or decreased by adapting a second product pipe valve 152, which may be a CPM valve.

Further, the control unit 128 can be configured to receive a skim milk flow measurement from a skim milk flow transmitter 154, which may be a mass-flow transmitter, placed in the main skim milk pipe 108, a cream flow measurement from a cream flow transmitter 156, which may be a mass-flow transmitter, placed in the main cream pipe 106, and optionally a skim milk pressure measurement measured by a skim milk pressure transmitter 158 placed in the main skim milk pipe 108. Based on these measurements a speed of a raw milk feed pump 160 can be regulated. An advantage of this is that no skim milk buffers are needed between the separator 104 and the first and second skim milk control valves 124, 126, or that a size of the skim milk buffers can be reduced. This is advantageous in that less equipment is needed and in that less floor space is required.

Based on the skim milk flow measurement and the cream flow measurement, the control unit 128 may also determine the position of a main cream control valve (not illustrated in FIG. 1, but in FIG. 2) placed in the main cream pipe 106 or positions of the first control valve 120, the second control valve 122 and the surplus cream valve 127. An advantage of this is that no or reduced size cream buffers are needed between the separator 104 and the first and second cream control valves 120, 122.

Figure 2:
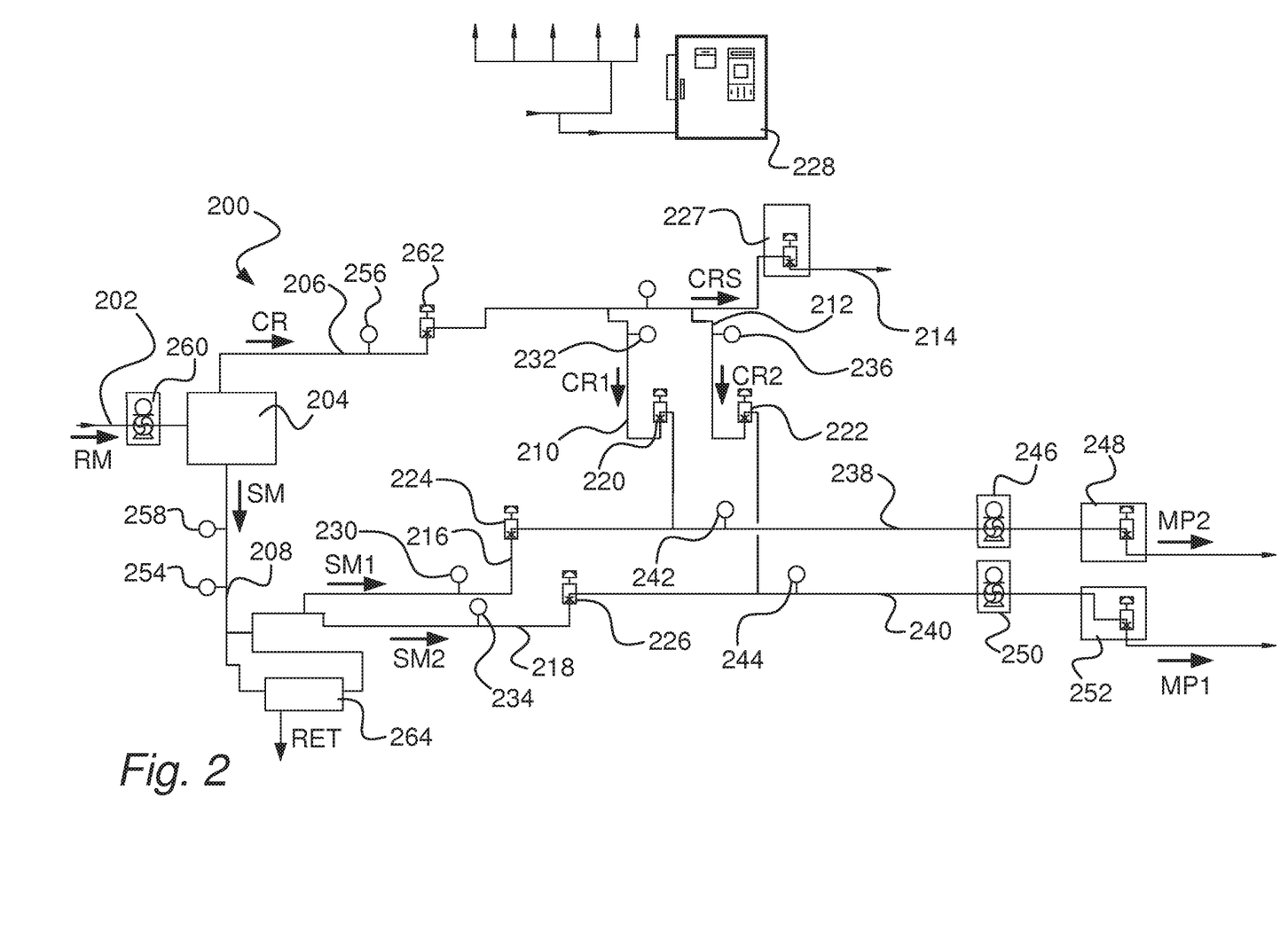
FIG. 2 is a schematic illustration of a system according to a second embodiment.

FIG. 2 illustrates another embodiment of a system 200 for producing the first milk product MP1 having the first fat content MPF1 and the second milk product MP2 having the second fat content MPF2 by way of example.

In line with the system 100 illustrated in FIG. 1 and as explained above, the raw milk RM is fed via a raw milk pipe 202 into a separator 204 that provides for that the raw milk RM is separated into cream CR fed into a main cream pipe 206 and skim milk SM fed into a main skim milk pipe 208. The first part CR1 of the cream CR is diverted into a first cream pipe 210 and the second part CR2 of the cream CR is diverted into the second cream pipe 212. Optionally, the surplus cream CRS is fed through the main cream pipe 214. The skim milk SM in the skim milk pipe 208 is divided into a first part SM1 fed into a first skim milk pipe 216 and a second part SM2 fed into a second skim milk pipe 218.

In order to control a flow rate of the first part CR1 of the cream CR a first cream control valve 220 can be provided and in order to control a flow rate of the second part CR2 of cream CR a second cream control valve 222 can be provided. Similarly, in order to control a flow rate of the first part SM1 of the skim milk SM a first skim milk control valve 224 can be provided and in order to control a flow rate of the second part SM2 of the skim milk SM a second skim milk control valve 226 can be provided. In addition, a surplus cream control valve 227 can be provided in order to control a flow rate of the surplus cream CRS in the main cream pipe 214.

In accordance with the system 100 illustrated in FIG. 1, a control unit 228 can be used for determining, based on the first fat content MPF1 and the second fat content MPF2, the first cream flow rate $Q_{CR1}$ for the first cream part CR1 flowing in the first cream pipe 210, the second cream flow rate $Q_{CR2}$ for the second cream part CR2 flowing in the second cream pipe 212, the first skim milk flow rate $Q_{SM1}$ for the first skim milk part SM1 flowing in the first skim milk pipe 216, and the second skim milk flow rate $Q_{SM2}$ for the second skim milk part SM2 flowing in the second skim milk pipe 218. After having determined the flow rates the control unit can adjust the set of valves 220, 222, 224, 226 that controls flows of liquid through the first cream pipe 210, the second cream pipe 212, the first skim milk pipe 216, and the second skim milk pipe 218 such that the first cream flow rate $Q_{CR1}$, the second cream flow rate $Q_{CR2}$, the first skim milk flow rate $Q_{SM1}$ and the second skim milk flow rate $Q_{SM2}$ are obtained.

As described above, the control unit 228 may receive input data from a first skim milk flow transmitter 230, a first cream flow transmitter 232, a second skim milk flow transmitter 234, a second cream pipe flow transmitter 236.

In addition, also in line with the system 100 illustrated in FIG. 1, the control unit 228 can further be configured to regulate blend pressure points in a first milk product pipe 238 and a second milk product pipe 240. In order to regulate the blend pressure point of the first milk product pipe 238, a first pressure measurement made by a first pressure transmitter 242 can be used as input data. Based on this input the blend pressure point in the first product pipe 238 may be increased by using a first booster pump 246 or decreased by adapting a first product pipe valve 248, which may be constant-pressure modulating (CPM) valve. Similarly, in order to regulate the blend pressure point of the second milk product pipe 240, a second pressure measurement made by a second pressure transmitter 244 can be received by the control unit 228. Based on this input the blend pressure in the second product pipe 240 may be increased by using a second booster pump 250 or decreased by adapting a second product pipe valve 252, which may be a CPM valve Further, in line with the system 100, the control unit 228 can be configured to receive a skim milk flow measurement from a skim milk flow transmitter 254, which may be a mass-flow transmitter, placed in the main skim milk pipe 208, a cream flow measurement from a cream flow transmitter 256, which may be a mass-flow transmitter, placed in the main cream pipe 206, and optionally a skim milk pressure measurement measured by a skim milk pressure transmitter 258 placed in the main skim milk pipe 208 such that a speed of a raw milk pump 260 can be regulated.

The system 200 illustrated in FIG. 2 differs from the system 100 illustrated in FIG. 1 in that a main cream control valve 262 placed in the main cream pipe 206 is provided. Based on the skim milk flow measurement and the cream flow measurement, the control unit 128 can control the main cream control valve 262 placed in the main cream pipe 106 such that no cream buffers are needed or at least that reduced size cream buffers can be used between the separator 204 and the first and second cream control valves 220, 222.

In addition, the system 200 illustrated in FIG. 2 differs from the system 100 illustrated in FIG. 2, in that a filtration device 236 is provided for filtering the skim milk SM in the main skim milk pipe 208. An advantage of this is that a protein enriched retentate RET can be achieved. In this way, if the raw milk RM has a high protein content part of the protein may be diverted and be used in other products.

The systems 100, 200 provide a number of advantages. First, it is made possible to continuously produce two milk products MP1, MP2 with different fat content MPF1, MPF2. This is advantageous for instance if producing niche products in small quantities. Second, it is possible to use one and the same separator 104 for producing two different products with different fat content, which comes with the advantages of lower cost for equipment, lower cost of operation and that less floor space is required. Third, as indicated above, the system 100 makes it possible to have no cream buffers or skim milk buffers, or at least to reduce the size of these. In addition to lowering equipment cost, this also provides for less floor space, i.e. that a more compact system can be achieved.

Further, unlike conventional standardization equipment, it is made possible by using the system 100 to provide the first milk product MP1 or the second milk product MP2 with a fat content that is higher than the fat content of the raw milk RM. For instance, if the first milk product MP1 is to be made with first fat content MPF1 that is higher than the fat content RMF of the raw milk RM, most of the cream CR in the main cream pipe 106 can be diverted into the first cream pipe 110, while only a small portion of the skim milk SM in the skim milk pipe 108 is fed into the first skim milk pipe 116.

The raw milk RM can be in a temperature range 3 to 25 degrees Celsius. Since this temperature range is in the same range as a storage temperature of the raw milk RM, an advantage of this is that no milk heating equipment is needed.

Figure 3:
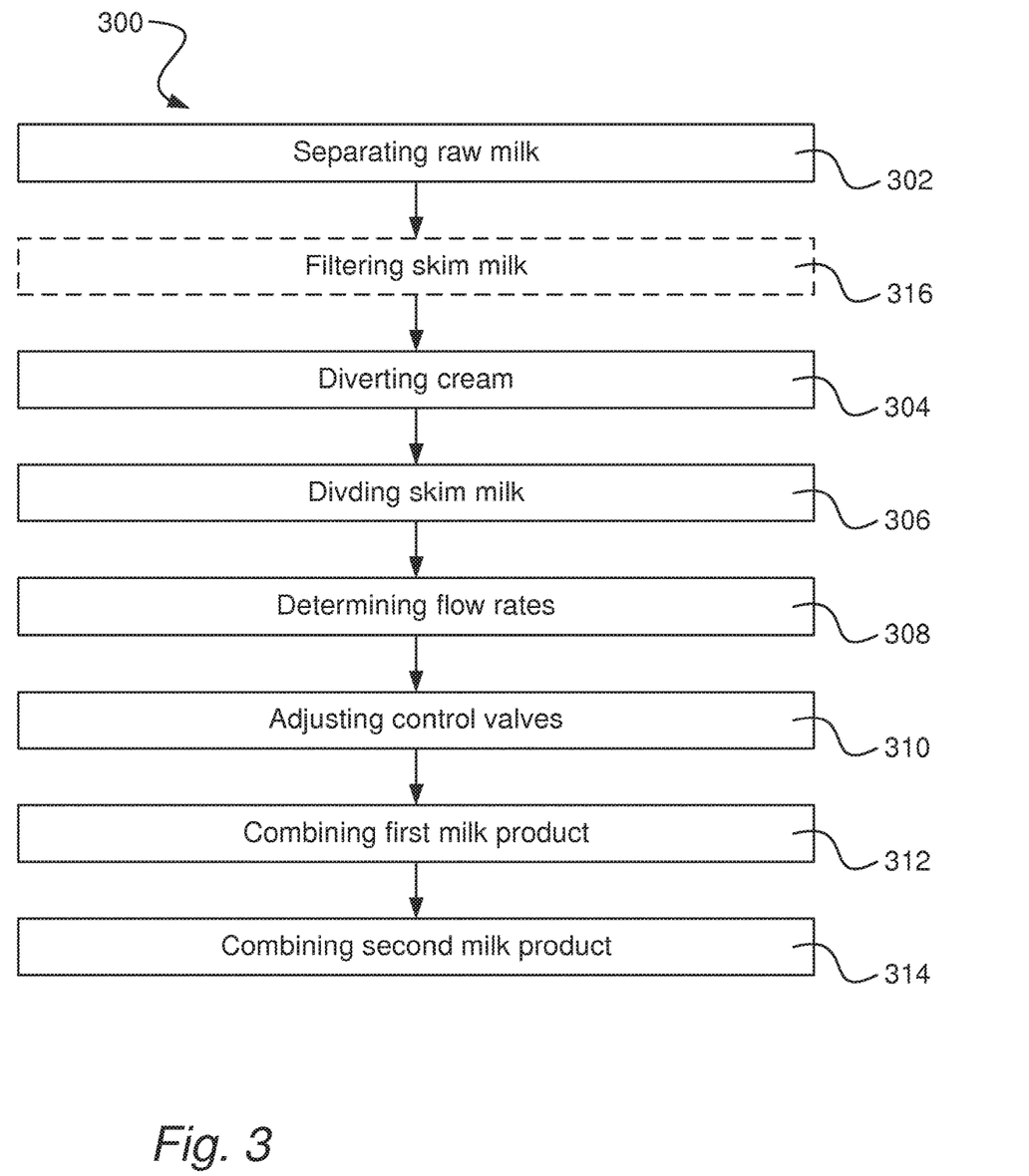
FIG. 3 is a flow chart illustrating steps of a method for producing a first and a second milk product.

FIG. 3 is a flowchart illustrating general steps of a method 300 for producing a first milk product MP1 having a first fat content MPF1 and a second milk product MP2 having a second fat content MPF2.

In a first step 302 raw milk RM is separated into cream CR and skim milk SM, wherein the cream CR is fed to a main cream pipe 106 and the skim milk SM to a main skim milk pipe 108, 208.

In a second step 304, from the main cream pipe 106, 206, it is diverted a first part CR1 of the cream CR into a first cream pipe 110, 210, and a second part CR2 of the cream CR into a second cream pipe 112, 212, wherein a surplus part CRS of the cream CR is fed through the main cream pipe 114, 214.

In a third step 306, the skim milk SM in the main skim milk pipe 108, 208 is divided such that a first part SM1 of the skim milk SM flows into a first skim milk pipe 116, 216 and a second part SM2 of the skim milk SM flows into a second skim milk pipe 118, 218.

In a fourth step 308, based on the first fat content MPF1 and the second fat content MPF2, it is determined
- a first cream flow rate $Q_{CR1}$ for the first cream part CR1 flowing in the first cream pipe 110, 210,
- a second cream flow rate $Q_{CR2}$ for the second cream part CR2 flowing in the second cream pipe 112, 212,
- a first skim milk flow rate $Q_{SM1}$ for the first skim milk part SM1 flowing in the first skim milk pipe 116, 216, and
- a second skim milk flow rate $Q_{SM2}$ for the second skim milk part SM2 flowing in the second skim milk pipe 118, 218.

In a fifth step 310, to obtain the first cream flow rate $Q_{CR1}$, the second cream flow rate $Q_{CR2}$, the first skim milk flow rate $Q_{SM1}$ and the second skim milk flow rate $Q_{SM2}$, a set of valves 120, 220, 122, 222, 124, 224, 126, 226 are adjusted that controls flows of liquid through the first cream pipe 110, the second cream pipe 112, 212, the first skim milk pipe 116, 216, and the second skim milk pipe 118, 218.

In a sixth step 312, the cream CR1 flowing in the first cream pipe 110, 210 is combined with the skim milk SM1 flowing in the first skim milk pipe 116, 216 into the first milk product MP1.

In a seventh step 314, the cream CR2 flowing in the second cream pipe 112, 212 is combined with the skim milk SM2 in the second skim milk pipe 118, 218 into the second milk product MP2.

Optionally, as illustrated in FIG. 2, in an eighth step 316, preceding the third step 306, the skim milk in the main skim milk pipe 208 is filtered to provide a protein rich retentate RET.

Figure 4:
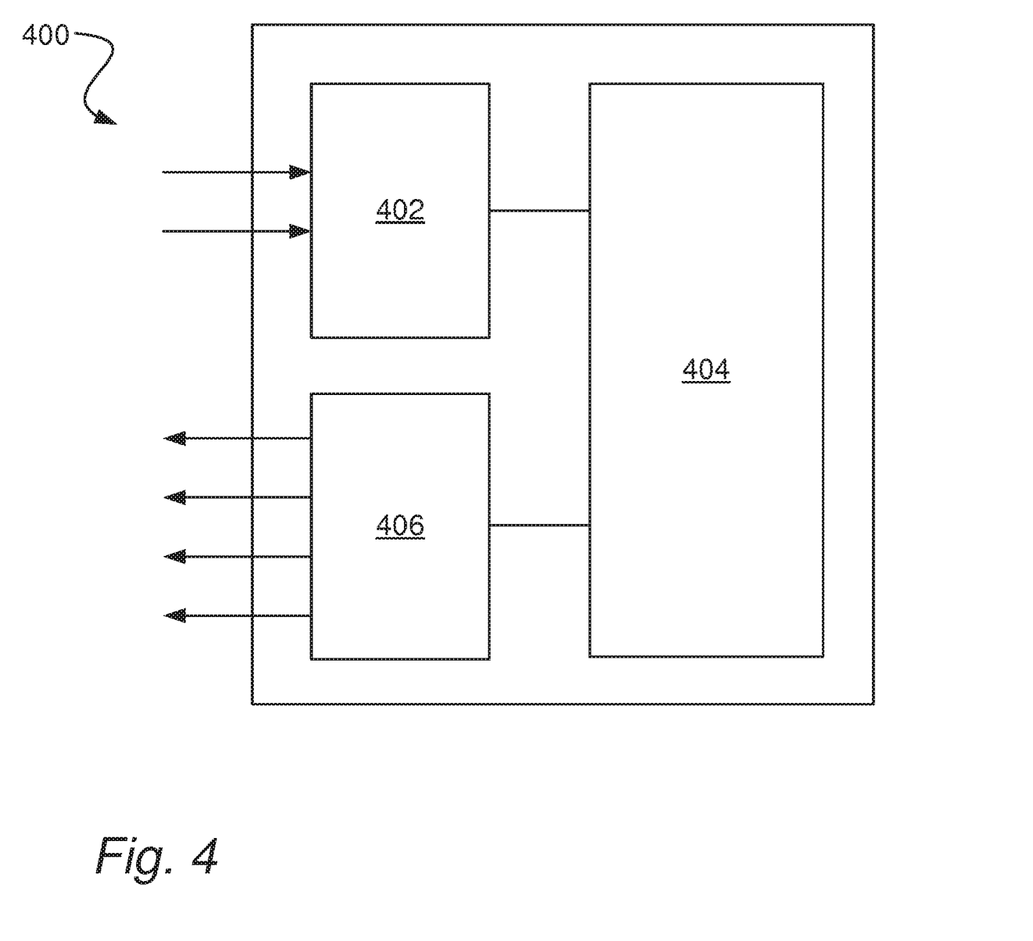
FIG. 4 is a schematic illustration of a control unit.

FIG. 4 illustrates a control unit 400, which can be used as the control unit 128 illustrated in FIG. 1 or the control unit 228 illustrated in FIG. 2, in further detail by way of example. The control unit 400 can comprise a data receiver 402 configured to receive data related to a first fat content MPF1 of a first milk product MP1 and a second fat content MPF2 related to a second milk product MP2, a data processor 404 configured to determine a first cream flow rate for a first cream pipe 110, 210, a second cream flow rate for a second cream pipe 112, 212, a first skim milk flow rate for a first skim milk pipe 116, 216 and a second skim milk flow rate for a second skim milk pipe 118, 218 based on the first fat content and the second fat content, and to determine a first cream control signal related to the first cream flow rate, a second cream control signal related to the second cream flow rate, a first skim milk control signal related to the first skim milk flow rate, and a second skim milk control signal related to the second skim milk flow rate, a control signal output device 406 configured to output the first cream control signal to a first cream control valve 120, 220 placed on the first cream pipe 110, 210, the second cream control signal to the second cream control valve 122, 222 placed on the second cream pipe 112, 212, a first skim milk control signal to the first skim milk control valve 124, 224 placed on the first skim milk pipe 116, 216 and a second skim milk control signal to the second skim milk control valve 126, 226 placed on the second skim milk pipe 118, 218.

From the description above follows that, although various embodiments of the invention have been described and shown, the invention is not restricted thereto, but may also be embodied in other ways within the scope of the subject-matter defined in the following claims.

The invention claimed is:

1. A method for producing a first milk product having a first fat content and a second milk product having a second fat content, said method comprising
separating raw milk into cream and skim milk, wherein the cream is fed to a main cream pipe and the skim milk to a main skim milk pipe,
diverting, from the main cream pipe, a first part of the cream into a first cream pipe, and a second part of the cream into a second cream pipe, wherein a surplus part of the cream is fed through the main cream pipe,
dividing the skim milk in the main skim milk pipe, such that a first part of the skim milk flows into a first skim milk pipe and a second part of the skim milk flows into a second skim milk pipe,
calculating, based on the first fat content and the second fat content,
a first cream flow rate for the first cream part flowing in the first cream pipe,
a second cream flow rate for the second cream part flowing in the second cream pipe,
a first skim milk flow rate for the first skim milk part flowing in the first skim milk pipe, and
a second skim milk flow rate for the second skim milk part flowing in the second skim milk pipe,
adjusting, to obtain the first cream flow rate, the second cream flow rate, the first skim milk flow rate and the second skim milk flow rate, a set of valves that controls flows of liquid through the first cream pipe, the second cream pipe, the first skim milk pipe, and the second skim milk pipe,
combining the cream flowing in the first cream pipe with the skim milk flowing in the first skim milk pipe into the first milk product, and
combining the cream flowing in the second cream pipe with the skim milk in the second skim milk pipe into the second milk product.

2. The method according to claim 1, wherein the separating of the raw milk into the cream and the skim milk is performed by only one separator.

3. The method according to claim 1, wherein the first milk product and the second milk product are continuously produced.

4. The method according to claim 1, comprising
determining, based on the first fat content and the second fat content, a surplus cream flow rate for the surplus part of the cream flowing in the main cream pipe, and
adjusting, based on the first cream flow rate, the second cream flow rate, the first skim milk flow rate, the second skim milk flow rate and the surplus cream flow rate, a first cream control valve arranged in the first cream pipe, a second cream control valve arranged in the second cream pipe, a first skim milk control valve arranged in the first skim milk pipe, a second skim milk control valve arranged in the second skim milk pipe, a surplus cream control valve arranged in the main cream pipe.

5. The method according to claim 1, wherein the first fat content or the second fat content is higher than a fat content of the raw milk.

6. The method according to claim 1, wherein the raw milk has a temperature from 3 to 25 degrees Celsius.

7. The method according to claim 1, comprising
filtering the skim milk in the main skim milk pipe to provide a protein rich retentate, before the dividing of the skim milk in the main skim milk pipe.

8. The method according to claim 1 wherein the step of adjusting, to obtain the first cream flow rate, the second cream flow rate, the first skim milk flow rate and the second skim milk flow rate, the set of valves that controls flows of liquid through the first cream pipe, the second cream pipe, the first skim milk pipe, and the second skim milk pipe, further comprises
measuring an actual first cream flow rate flowing in the first cream pipe,
measuring an actual second cream flow rate flowing in the second cream pipe,
measuring an actual first skim milk flow rate flowing in the first skim milk pipe,
measuring an actual second skim milk flow rate flowing in the second skim milk pipe,
determining a position of the first cream control valve arranged in the first cream pipe based on the actual first cream flow rate and the actual first skim milk flow rate,
determining a position of the second cream control valve arranged in the second cream pipe based on the actual second cream flow rate and the actual second skim milk flow rate,
determining a position of the first skim milk control valve arranged in the first skim milk pipe based on the actual first cream flow rate and the actual first skim milk flow rate, and
determining a position of the second cream control valve arranged in the second cream pipe based on the actual second cream flow rate and the actual second skim milk flow rate.

9. The method according to claim 1, wherein the step of determining, based on the first fat content and the second fat content, the first cream flow rate, the second cream flow rate, the first skim milk flow rate, and the second skim milk flow rate is further based on a fat content of the cream in the main cream pipe and a fat content of the skim milk in the main skim milk pipe.

10. A system for producing a first milk product with a first fat content and a second milk product with a second fat content, said system comprising
a separator arranged to receive raw milk and to output cream in a main cream pipe and skim milk in a main skim milk pipe,
a cream pipe arrangement comprising the main cream pipe, a first cream pipe and a second cream pipe, wherein the first and second cream pipe divert from the main cream pipe,
a skim milk pipe arrangement comprising the main skim milk pipe, a first skim milk pipe and a second skim milk pipe, wherein the main skim milk pipe is divided into the first and second skim milk pipe,
a set of valves that controls flows of liquid through the first cream pipe, the second cream pipe the first skim milk pipe, and the second skim milk pipe, a control unit configured
to calculate, based on the first fat content and the second fat content,
- a first cream flow rate for the first cream part flowing in the first cream pipe,
- a second cream flow rate for the second cream part flowing in the second cream pipe,
- a first skim milk flow rate for the first skim milk part flowing in the first skim milk pipe, and
- a second skim milk flow rate for the second skim milk part flowing in the second skim milk pipe, and to adjust, to obtain the first cream flow rate, the second cream flow rate, the first skim milk flow rate and the second skim milk flow rate, the set of valves, a first milk product pipe arrangement comprising the first cream pipe, the first skim milk pipe and a first milk product pipe, wherein the first cream pipe and the first skim milk pipe feed into the first milk product pipe, and a second milk product pipe arrangement comprising the second cream pipe, the second skim milk pipe and a second milk product pipe, wherein the second cream pipe and the second skim milk pipe feed into the second milk product pipe.

11. The system according to claim 10, wherein the system is void of buffer tanks.

12. The system according to claim 10, wherein the control unit is further configured to determine, based on the first fat content and the second fat content, a surplus cream flow rate for the surplus part of the cream flowing in the main cream pipe, and to adjust, based on the first cream flow rate, the second cream flow rate, the first skim milk flow rate, the second skim milk flow rate and the surplus cream flow rate, a first cream control valve arranged in the first cream pipe, a second cream control valve arranged in the second cream pipe, a first skim milk control valve arranged in the first skim milk pipe, a second skim milk control valve arranged in the second skim milk pipe, and a surplus cream control valve arranged in the main cream pipe.

13. The system according to claim 10, wherein the raw milk has a temperature from 3 to 25 Celsius degrees.

14. The system according to claim 10, further comprising a filtration device placed in the main skim milk pipe to provide a protein rich retentate.

15. The system according to claim 14, wherein the filtration device is an ultrafiltration device.

* * * * *